March 21, 1972          R. G. TOWLE                3,650,936
                      CUTTING MACHINE
Filed Oct. 22, 1969                          9 Sheets-Sheet 1

INVENTOR
ROBERT G. TOWLE
BY
ATTORNEY

March 21, 1972   R. G. TOWLE   3,650,936
CUTTING MACHINE

Filed Oct. 22, 1969   9 Sheets-Sheet 2

INVENTOR
ROBERT G. TOWLE
BY
ATTORNEY

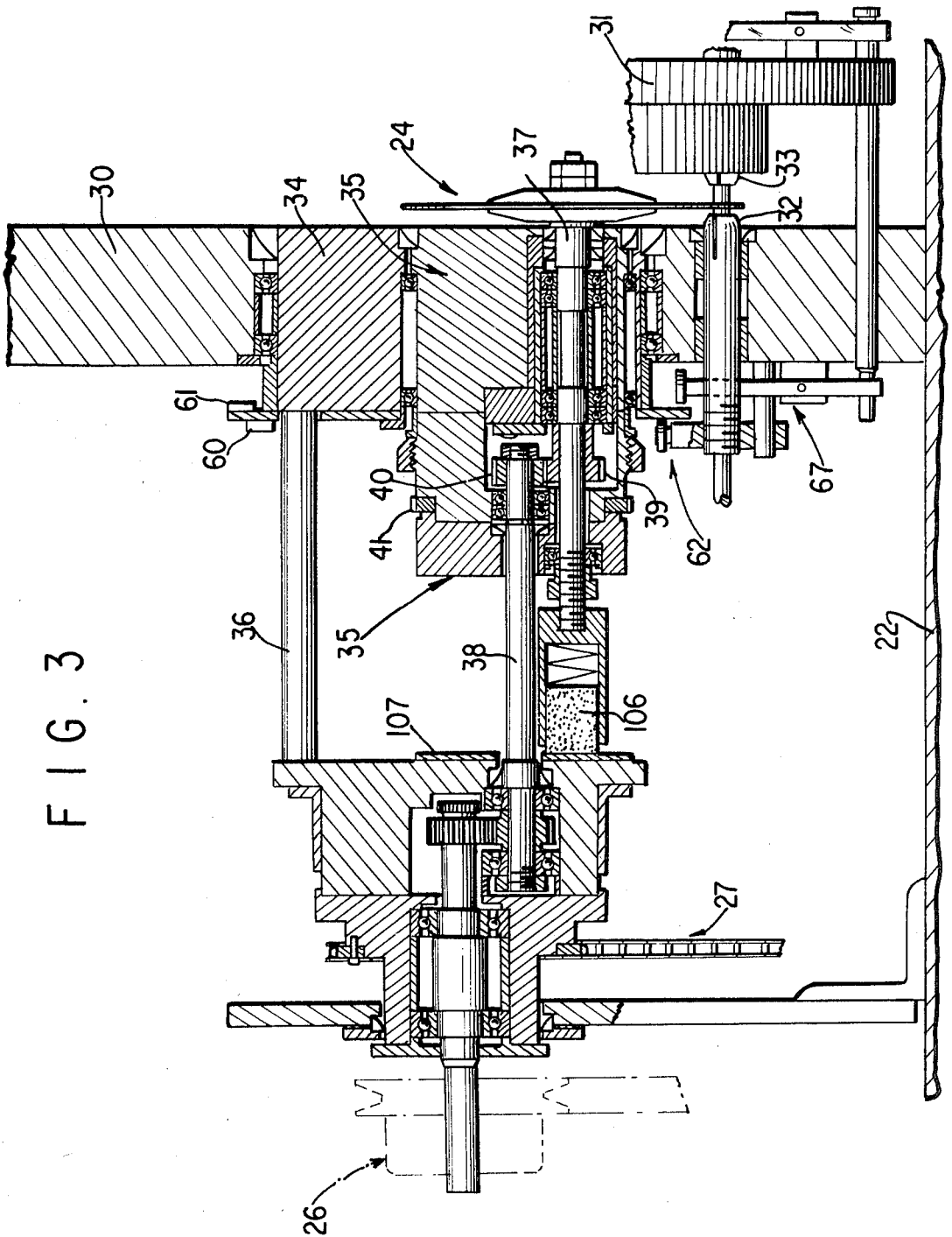

March 21, 1972  R. G. TOWLE  3,650,936
CUTTING MACHINE

Filed Oct. 22, 1969  9 Sheets-Sheet 4

INVENTOR
ROBERT G. TOWLE
BY
ATTORNEY

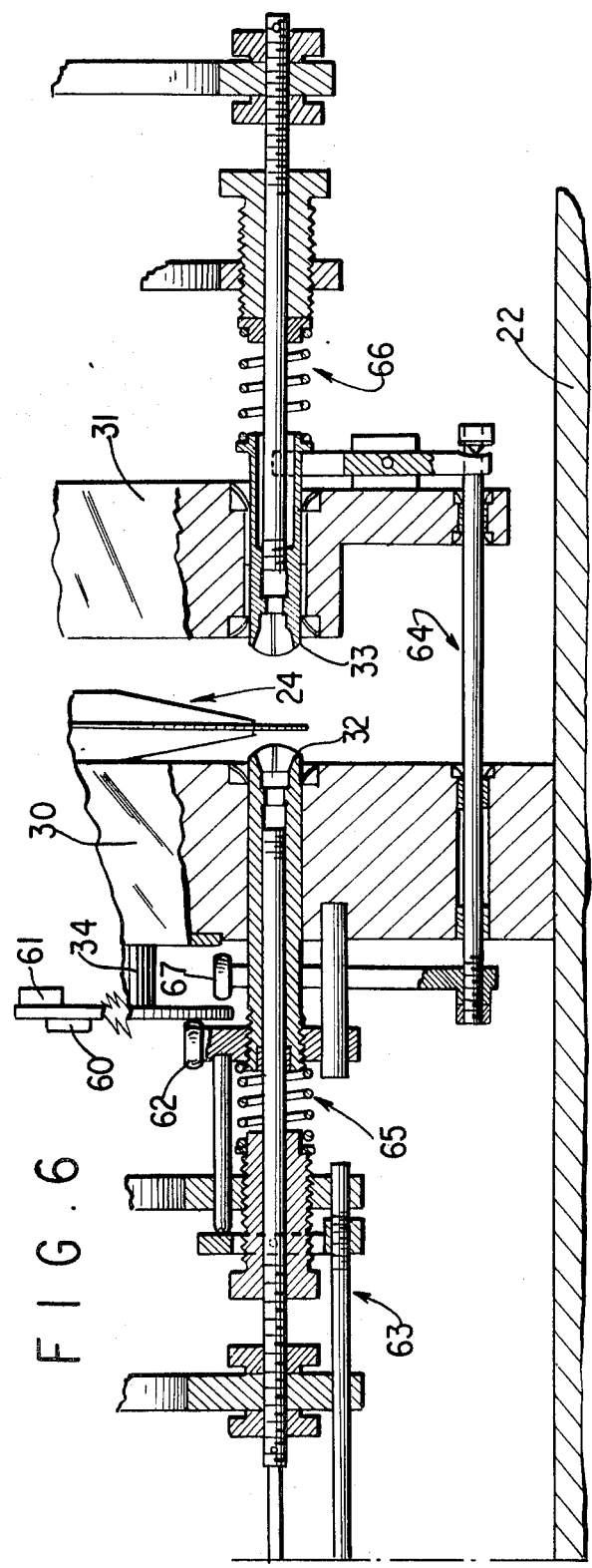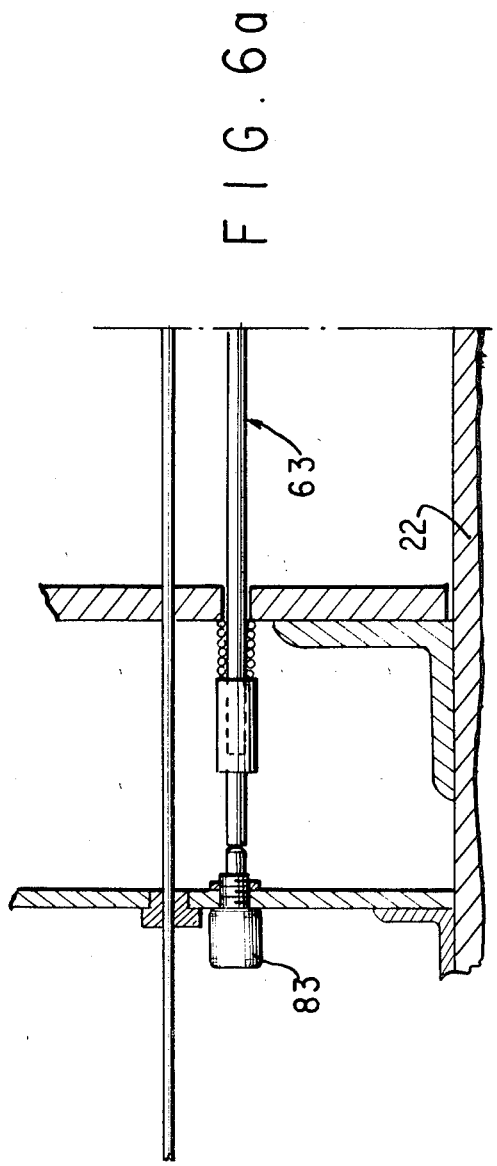

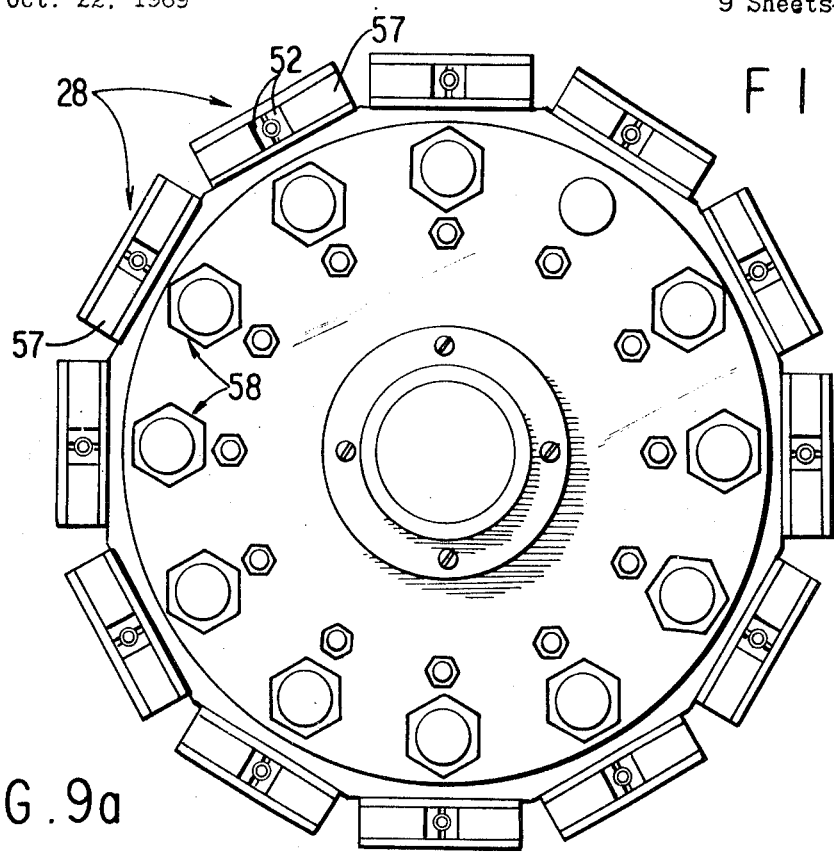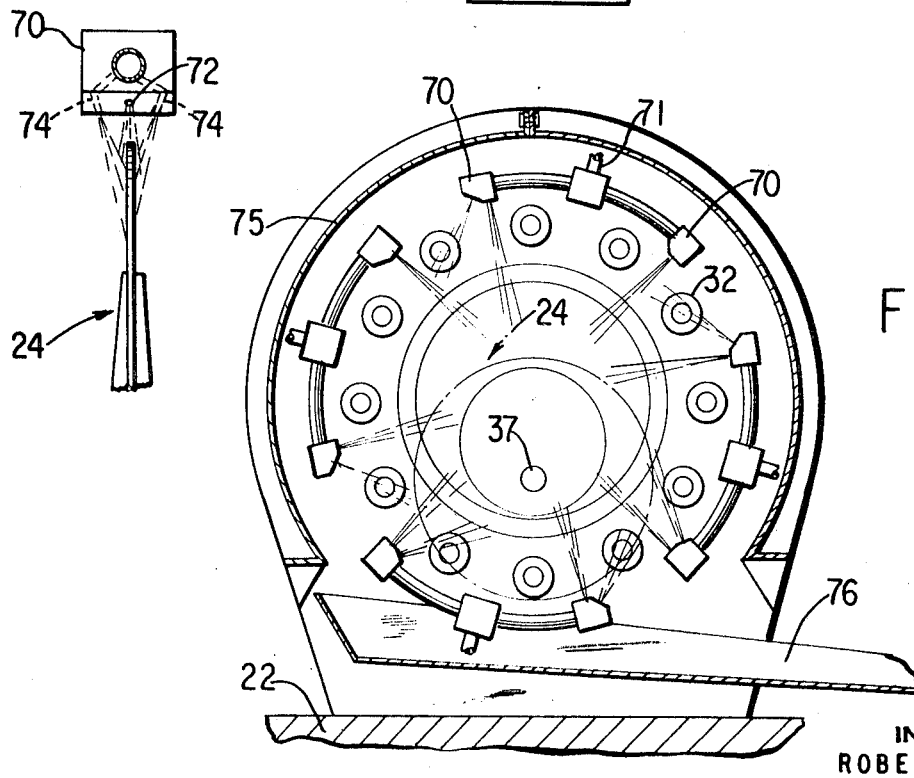

March 21, 1972   R. G. TOWLE   3,650,936
CUTTING MACHINE
Filed Oct. 22, 1969   9 Sheets-Sheet 7
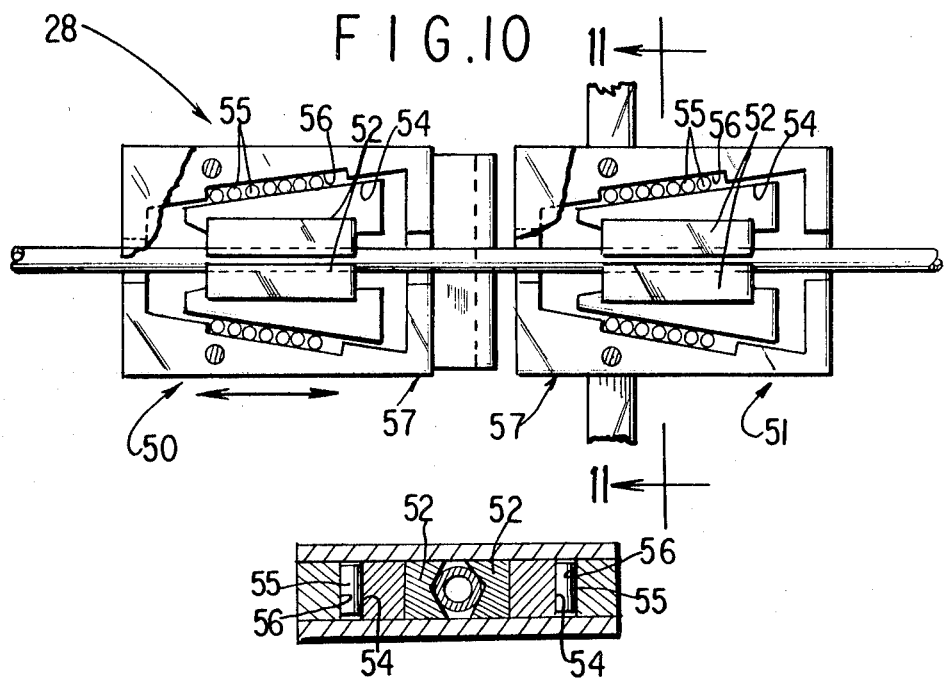
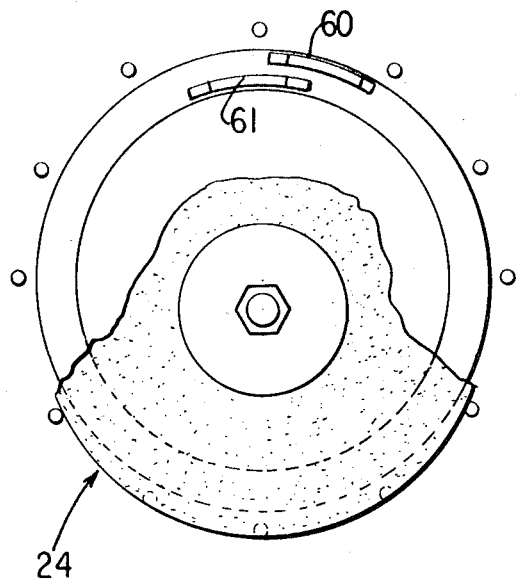
INVENTOR
ROBERT G. TOWLE
BY
ATTORNEY March 21, 1972     R. G. TOWLE     3,650,936
CUTTING MACHINE
Filed Oct. 22, 1969     9 Sheets-Sheet 8
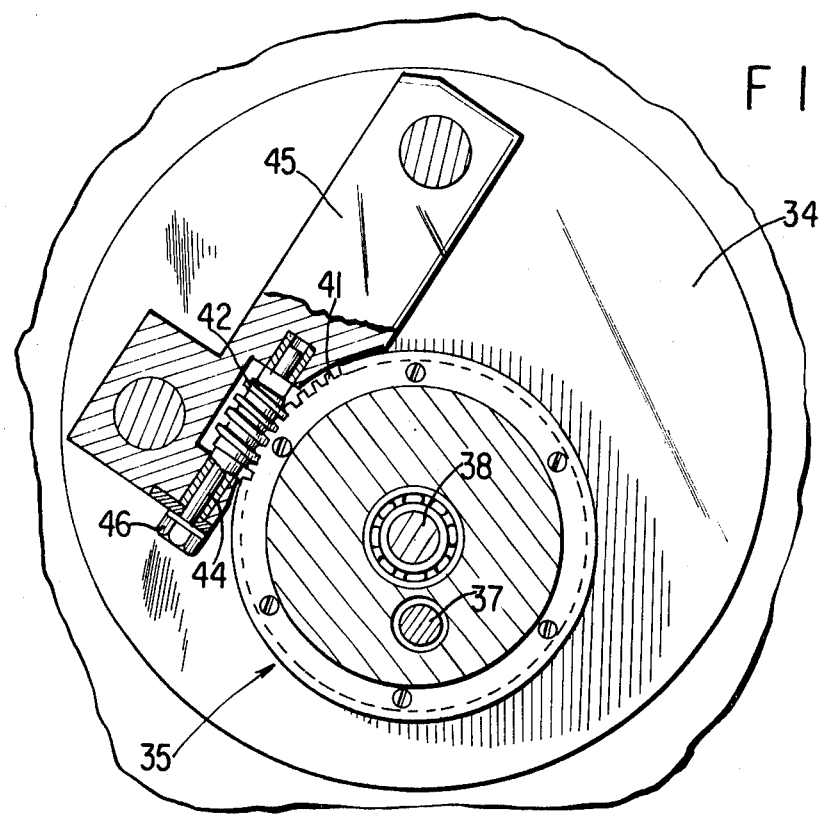
FIG.13
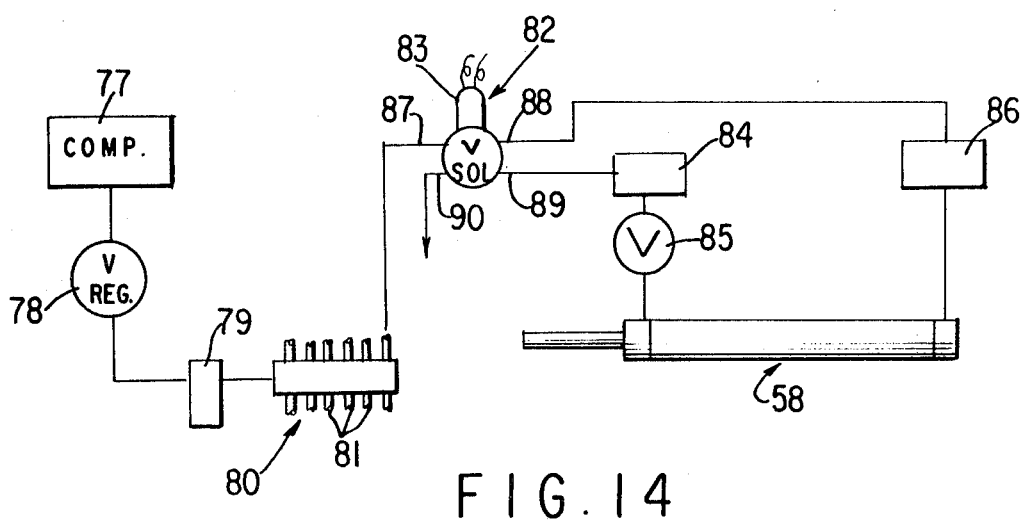
FIG.14
INVENTOR
ROBERT G. TOWLE
BY
ATTORNEY

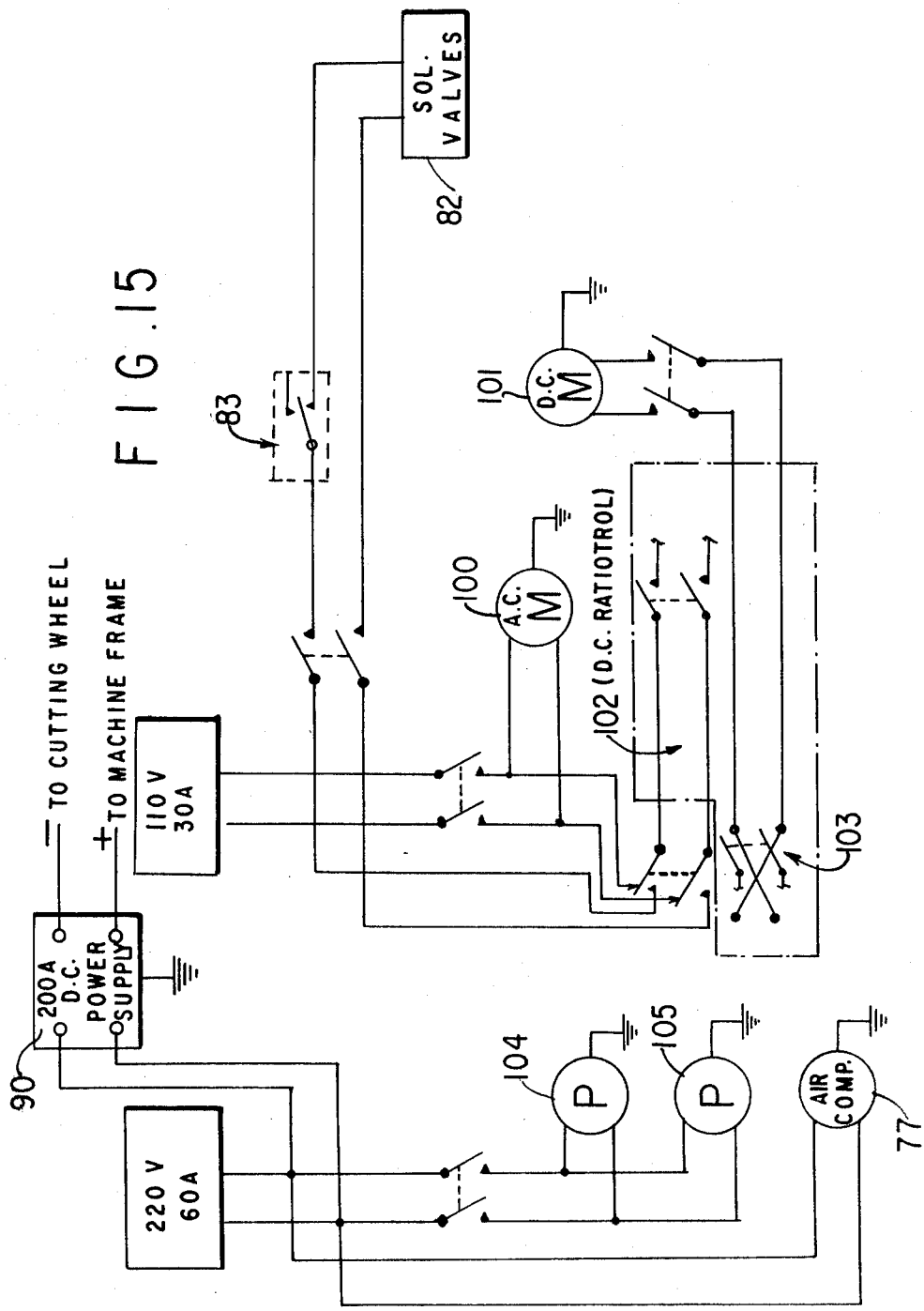

United States Patent Office 3,650,936
Patented Mar. 21, 1972

3,650,936
CUTTING MACHINE
Robert G. Towle, 2 Mary Ann Lane,
Nanuet, N.Y. 10954
Filed Oct. 22, 1969, Ser. No. 868,448
Int. Cl. C23b 5/68; B23p 1/00
U.S. Cl. 204—212                            12 Claims

ABSTRACT OF THE DISCLOSURE

A machne for cutting a series of pieces arranged from work in a circle with a wheel having a cutting edge subject to wear and reduction of diameter. The wheel is rotated about its center and the center is orbited in a circle eccentric to the center of the circle in which the work is arranged. As the wheel wears and its diameter is reduced, the eccentricity of the wheel center and work center is increased.

BACKGROUND OF THE INVENTION

(1) Field of the invention

The present invention relates to cutting machines particularly adapted for electrolytically cutting hard metallic rods or tubes and will be illustrated and described as such a machine although it can be used advantageously for cutting other types of material.

(2) Description of the prior art

Electrolytic cutting usually is accomplished by connecting metallic work to a source of direct current to serve as cathodes, connecting an electrically conductive abrasive cutting wheel to the source of direct current to serve as the anode, and spraying an electrolyte onto the wheel and the work. The wheel is in the form of a thin disc to provide an edge for assisting the electrolyte in cutting through hard metallic work.

Consequently, the diameter of the wheel will be reduced rapidly as it wears and provision must be made to bring the center of the wheel closer to the work. This can be done when a single piece is being cut but no satisfactory solution has been found for doing this when a group of pieces are being cut in one cycle of operation.

SUMMARY OF THE INVENTION

Accordingly, an object of the present invention is to provide a machine for cutting a group of pieces in one cycle of operation in a manner to prolong the useful life of the cutting wheel.

Another object is to provide such a machine wherein the cutting wheel is readily adjusted to determine the depth of the cut.

Another object is to provide such a machine wherein the work is fed automatically.

Another object is to provide such a machine which is particularly adaptable for the electrolytic cutting of metallic tubes.

A further object is to provide such a machine which is relatively simple and compact in arrangement and is practical and reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing a cutting machine which comprises a work holder having a series of spaced apart work holding stations arranged in a circle, a wheel having a cutting edge and being rotatably mounted for transversely cutting the work into pieces, means for rotating the wheel about its center, and means for orbiting the center of the wheel in a circle eccentric to the center of the circle in which the work holding stations are arranged. Means are provided for adjusting the eccentricity of the circle in which the wheel orbits to determine the depth of the cut and to move the wheel closer to the work as the wheel wears down.

When it is desired to accomplish electrolytic cutting, an electrically conductive wheel is utilized, means are provided for spraying an electrolyte onto the wheel and the work, and the work holding stations and the wheel are respectively connected to a source of direct current as the cathodes and the anode.

BRIEF DESCRIPTION OF THE DRAWINGS

FIG. 3 is an enlarged sectional view taken along the line 3—3 on FIG. 2 illustrating wheel driving mechanism.

FIGS. 6 and 6a put together end to end provide an enlarged sectional view taken along the line 6, 6a–6, 6a on FIG. 4 which illustrates mechanism for operating the chucks.

FIG. 8 is an enlarged sectional view taken along the line 8—8 on FIG. 1 illustrating a frame for supporting feed mechanism.

FIG. 9 is an elevational view illustrating heads for spraying electrolyte onto the wheel and the pieces being cut.

FIG. 10 is an enlarged sectional view of a work feeding jaw assembly.

FIG. 11 is a sectional view taken along the line 11—11 on FIG. 10.

FIG. 12 is a schematic view illustrating the position of the cutting wheel when it is new.

FIG. 13 is an enlarged sectional view of an arrangement for adjusting the eccentricity of the wheels orbit.

FIG. 14 is a diagrammatic view of a pneumatic system for advancing the work.

FIG. 15 is a wiring diagram of an electrical system.

DESCRIPTION OF THE PREFERRED EMBODIMENT.—GENERAL DESCRIPTION

Figure 1:
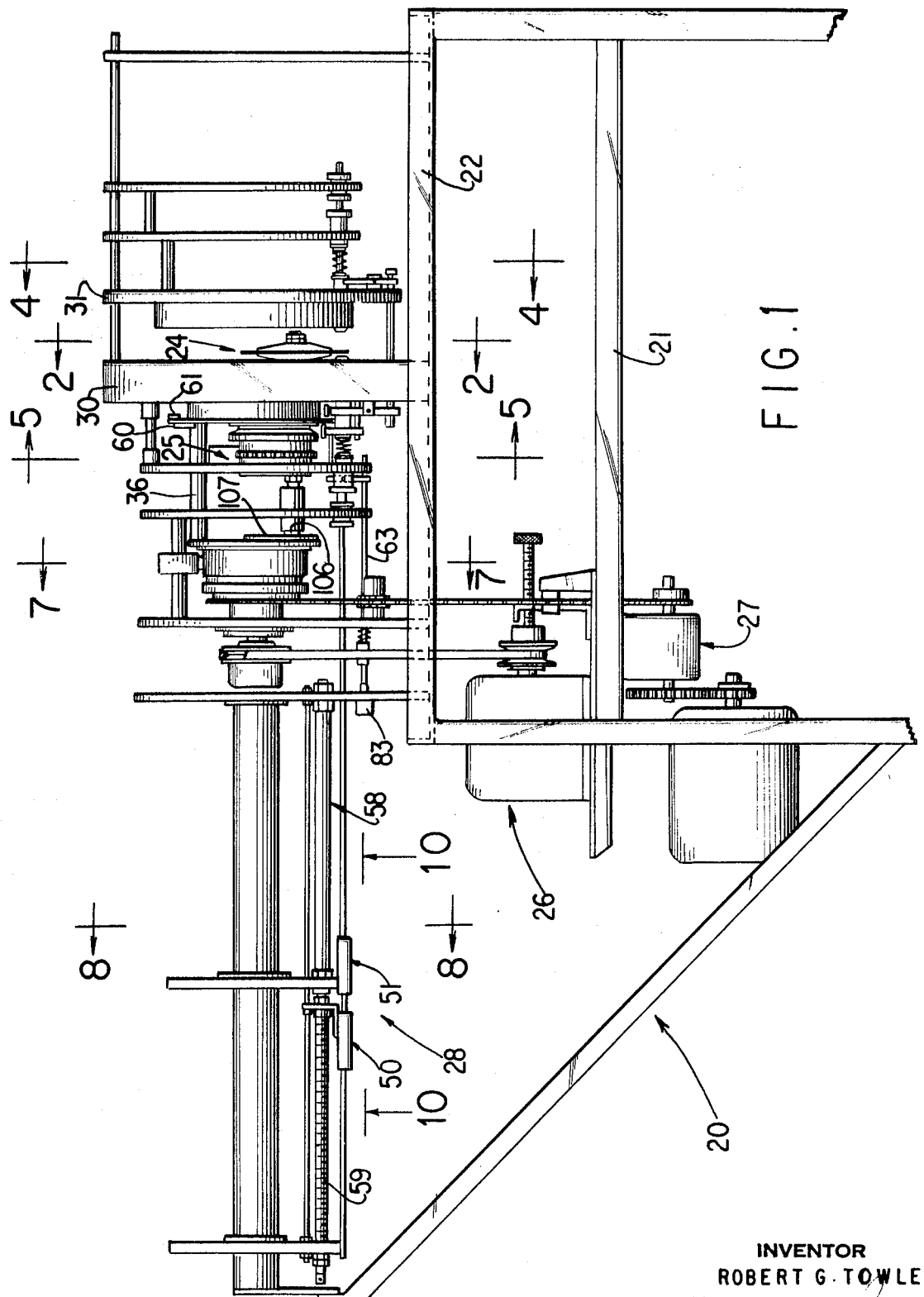
FIG. 1 is a side elevational view of a cutting machine in accordance with the present invention.

Referring now to FIG. 1 of the drawing in detail, a cutting machine is shown which generally comprises a frame 20 having a shelf 21 and a bed plate 22; a cutting wheel 24; an arrangement 25 for orbiting the cutting wheel; drive means 26 on the shelf 21 for rotating the cutting wheel at high speed; drive means 27 on the shelf 21 for operating the orbiting arrangement at a much lower speed; and mechanism 28 for feeding and holding the work from which pieces are to be cut and for ejecting the cut pieces.

The machine is arranged to cut a group of twelve pieces of work in each cycle of operation; that is, each time the cutting wheel 24 makes an orbit. For the purpose of clarity only one mechanism 28 is shown although the machine is equipped with twelve of such mechanisms which are identical.

While not shown in FIG. 1, the machine further includes an electrical circuit for connecting the work as cathodes and the cutting wheel as an anode to a source of high amperage direct current; and an arrangement for spraying an electrolyte onto the cutting wheel.

The cutting wheel station

Figure 2:
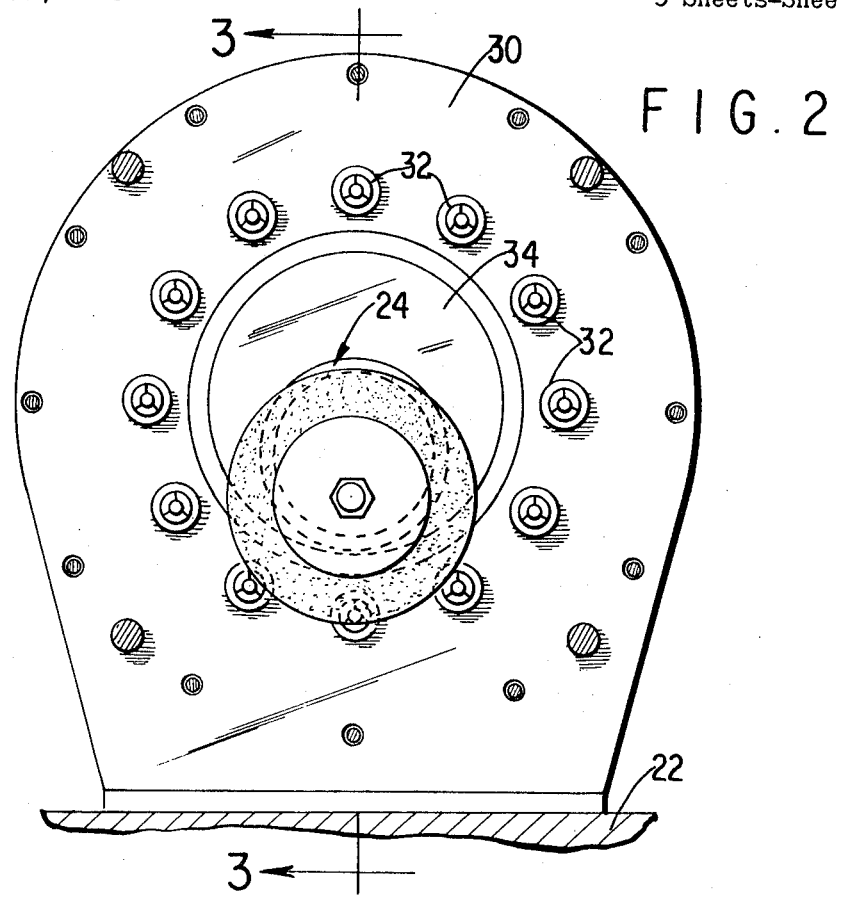
FIG. 2 is an enlarged sectional view taken along the line 2—2 on FIG. 1 illustrating the cutting wheel when worn down and in maximum eccentric position.
Figure 4:
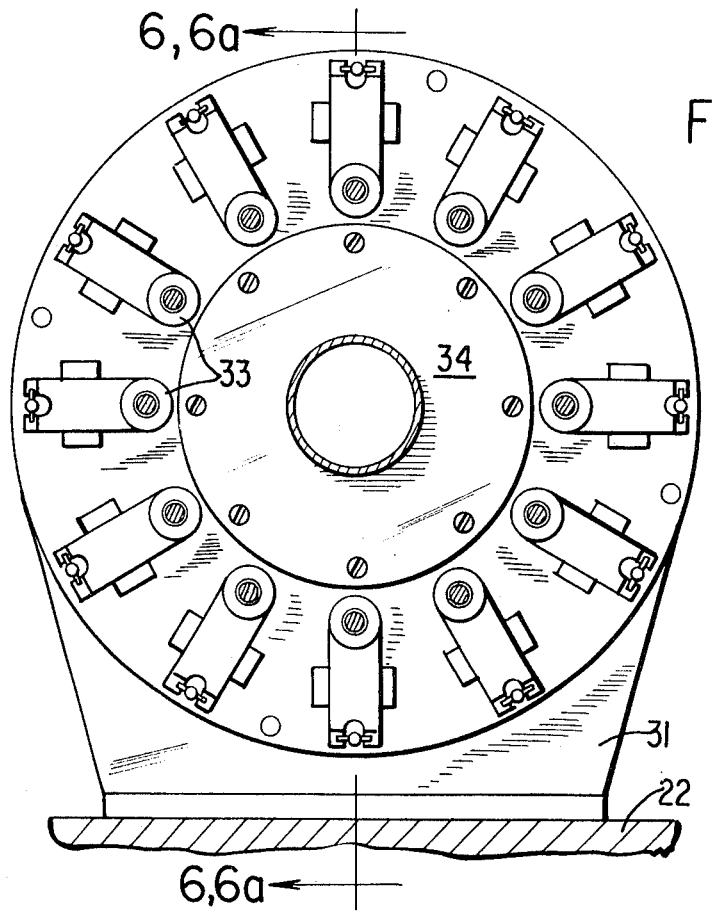
FIG. 4 is an enlarged sectional view taken along the line 4—4 on FIG. 1 illustrating chucks in front of the wheel for holding the work.

Referring more particularly to FIGS. 2, 3 and 4, a cutting station is shown which includes an inner vertical plate 30 secured to the bed plate 22, and an outer vertical plate 31 mounted on the plate 30 with the cutting wheel 24 disposed between the plates 30 and 31. The plates 30 and 31, respectively, have a group of twelve horizontally aligned chucks 32 and 33 arranged in a circle for receiving and holding the work to be cut and for releasing the cut pieces. The operation of these chucks will be described in greater detail hereinafter.

For example, the centers of the chucks 32 and 33 lie in a circle having a ten inch diameter and the cutting wheel when new also has a ten inch diameter. A suitable abrasive electrically conducting cutting wheel is disclosed in U.S. Pat. No. 3,283,448.

As the cutting wheel is used, it wears down to a smaller and smaller diameter. In order to compensate for this, the cutting wheel is mounted for rotation about its center and for orbiting the center in a circle which is eccentric to circle in which the work holding stations or chucks 32 and 33 are arranged.

As shown in FIGS. 2, 3, 5 and 13, the foregoing is accomplished by rotatably mounting a circular housing 34 in the inner plate 30, mounting a circular housing 35 for turning movement in the housing 34 at an eccentric location, rotating the housing 34 by a connection 36 to the drive means 27, and rotatably mounting a spindle 37 which carries the cutting wheel 24 at an eccentric location in the housing 35. The spindle is driven by a shaft 38 in alignment with the center of the housing 35 through gears 39 and 40, and the shaft 38 is in driving connection with the drive means 26.

When the cutting wheel 24 is new, the housing 35 is positioned so that the cutting wheel spindle is only slightly eccentric. As the housing 34 is rotated, it orbits the cutting wheel so that its cutting edge barely passes completely through the work to be cut. When the cutting wheel wears down, the housing 35 is turned to increase the eccentricity of the spindle so that edge of the cutting wheel yet barely passes completely through the work as the wheel is orbited. For example, in FIG. 2 the cutting wheel is shown worn down to a point where it is positioned at maximum eccentricity.

Figure 5:
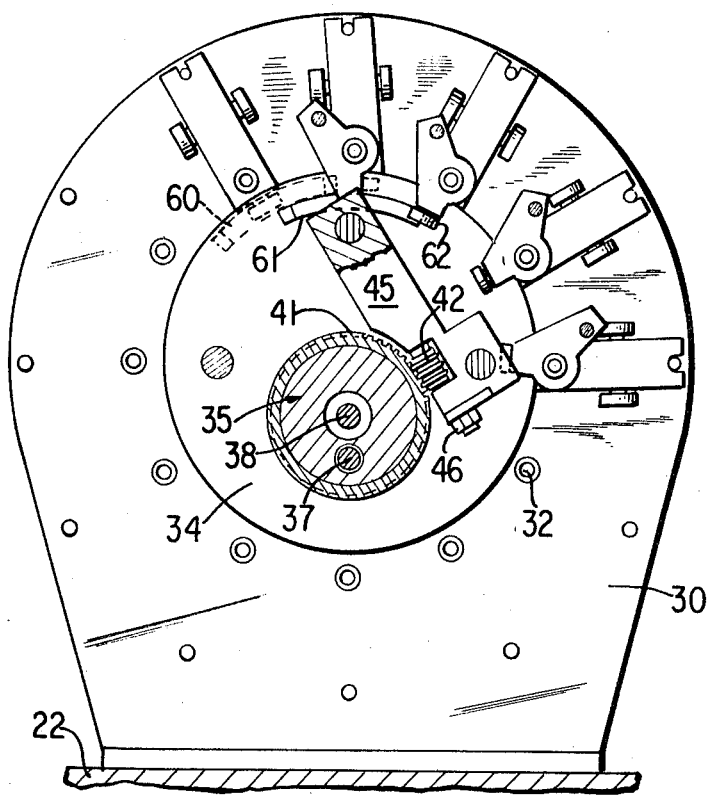
FIG. 5 is an enlarged sectional view taken along the line 5—5 on FIG. 1 illustrating chucks in back of the wheel for holding the work from which the pieces are cut.

As shown in FIGS. 5 and 13, the housing 35 carries a spur gear 41 which is turned by a worm 42 on a shaft 44 rotatably mounted in a bracket 45 secured to the housing 34. One end of the shaft 44 extends outwardly of the bracket and carries a head 46 adapted to be engaged by a tool for turning the shaft 44 to thereby turn the housing 35 and adjust the eccentricity of the cutting wheel.

The cutting wheel may be arranged so that, as it orbits, it is progressively cutting the parts. For example, if one 0.040 inch diameter part is cut at a time, this takes one second so that twelve parts can be cut in twelve seconds in one orbit of the wheel. Thus, the wheel completes five orbits in one minute and cuts sixty parts per minute and cuts 3600 parts per hour.

When 0.25 inch diameter parts are being cut, the wheel may be cutting stepwise as many as three parts at a time (FIG. 12).

The feed mechanism

Referring now to FIGS. 1 (left side), 5, 6, 8, 10 and 11, the feed mechanism 28 is shown which comprises a longitudinally movable jaw 50 and stationary jaw 51 for gripping the work to be cut and for step-wise advancing the same to the cutting station. As shown in FIGS. 10 and 11, these jaws each have a pair of gripping members 52 provided with two opposite slanted surfaces 54 which ride on roller bearings 55 riding on two opposite slanted surfaces 56 within a casing member 57. The jaws are arranged so that when the work is fed the jaw 50 grips the work and the jaw 51 releases the work to enable the work to be moved from left to right as viewed. After a feeding step, on the return stroke from right to left as viewed, the jaw 51 grips the work and the jaw 50 releases the same.

Movement of the jaw 50 is effected by a pneumatically or hydraulically operated cylinder and a piston arrangement 58 having a piston rod extension 59 threadedly connected to the jaw 50 to enable the length of the feed stroke to be adjusted.

The chucks

The chucks 32 and 33 (FIGS. 1, 2, 3, 4, 5, 6 and 6a) are constructed and arranged so that the work to be cut is gripped during the cutting operation. After the cutting operation has been completed the chucks 33 on the plate 31 continue to grip the pieces which have been cut. Eventually, the chucks 33 release the pieces which have been cut and allows them to be delivered to a receptacle for collection. At about the same time, the chucks 32 release the work to be cut to enable the same to be advanced for the next cutting operation.

Operation of the feed mechanism and the chucks

The chucks 32 and 33 are progressively opened by mechanism which includes a cam 60 on one side of the housing 34 (FIGS. 3 and 5), a cam 61 on the other side of the housing 34 (FIG. 3), a cam follower 62 (FIG. 6) engaged by the cam 60 which through linkage opens the chucks 32, a cam follower 67 engaged by the cam 61 which through linkage opens the chuck 33, and return springs 65 and 66 for respectively effecting closing of the chucks 32 and 33. The cam 60 and cam follower 62 through linkage 63 effect actuation of a microswitch 83 which controls the piston and cylinder arrangement 58.

The electrolyte spray system

As shown in FIG. 9, the electrolyte spray system comprises four pairs of spray heads 70 connected to a source of electrolyte (not shown) by piping 71. Each spray head has a nozzle 72 for directing electrolyte onto the cutting edge of the wheel 24, and has two nozzles 74 arranged to spray the electrolyte onto both sides of the wheel near the cutting edge. Centrifugal force directs the electrolyte from the sides of the wheel onto work being cut.

The spray heads 70 are shielded by a casing 75, and the used electrolyte is collected for re-use by a pan 76 beneath the spray heads which directs it into a tank (not shown).

A suitable electrolyte comprises fifteen pounds of sodium nitrate and two pounds of sodium nitrite dissolved in ten gallons of water.

The pneumatic/hydraulic system

In FIG. 14, a system is shown for operating the piston cylinder arrangement 58. This system comprises an air compressor 77, a pressure regulator 78, an oiler 79, a manifold 80 having twelve outlets 81 (one for each arrangement 58), a solenoid operated four-way valve 82, a hydraulic reservoir 84 connected to one end of the cylinder, through a flow control valve 85, and a hydraulic reservoir 86 connected to the other end of the cylinder.

The valve 82 has an inlet port 87, two outlet ports 88 and 89 respectively connected to the reservoirs 84 and 86, and an exhaust port 90. When the solenoid 83 of the valve 82 is energized, the inlet port 87 is connected to the outlet port 88 to cause the reservoir 84 to be pressurized and the port 89 is connected to the exhaust port 90 to release air under pressure in the reservoir 86, whereupon the piston of the arrangement 58 moves from left to right as viewed to effect the feed stroke of the mechanism 28. When the solenoid of the valve 82 is deenergized, the inlet port 87 is connected to the outlet port 89 to cause the reservoir 86 to be pressurized and the port 88 is connected to the exhaust port 99 to release air under pressure in the reservoir 84, whereupon the piston moves from right to left as viewed to effect the return stroke of the mechanism 28.

The electrical system

As shown in FIG. 15, the electrical system includes a 110 volt AC source for operating a motor 100 which drives the wheel 24, energizing the solenoid valve 82, and operating a DC motor 101 through an AC/DC transformer rectifier 102 which drives the orbiting housing 34. The rectifier includes a forward, off and reverse switch 103 arrangement for controlling the motor 101. The rectifier is of the variable type and controls the orbit housing speed by varying the speed of the DC motor 101.

The system also includes a 220 volt AC source for operating the motor of the air compressor 77, the motor of a pump 104 for pressurizing the electrolyte, and the motor of a pump 105 for withdrawing the electrolyte from the collection tank for re-use. The solenoid valve 82 is DC operated and is controlled by the microswitch 83 which is operated by the linkage 63.

The 220 volt AC also serves as the power source of a low voltage 200 ampere DC power supply which has its negative side connected to the cutting wheel 24 and has its positive side connected through frame of the machine to the material being cut so that wheel serves as the cathode and the material serves as an anode.

Figure 7:
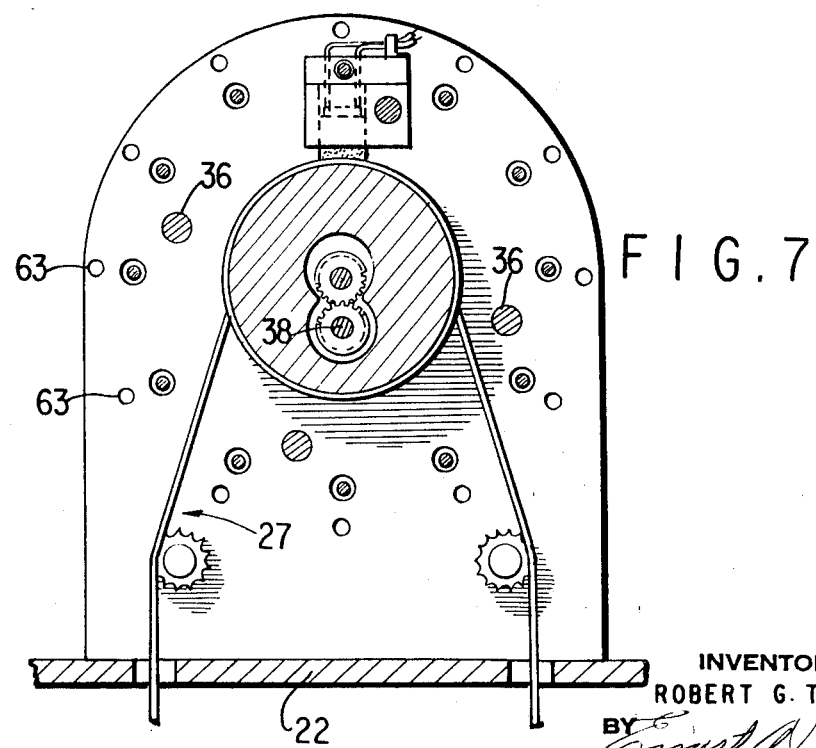
FIG. 7 is an enlarged sectional view taken along the line 7—7 on FIG. 1 illustrating an arrangement for conducting electrical current to the wheel.

To accomplish the foregoing, the wheel 24 is electrically insulated from the chucks 32 and 33; the wheel is connected to electro-negative through its spindle 37, a brush 106 on the spindle which engages a plate 107 connected to the 200 ampere source to pick up the current (FIGS. 3 and 7); and the chucks 32 and 33 are connected to electro-positive through the frame of the machine.

Summation

From the foregoing description, it will be seen that the present invention provides a greatly improved cutting machine, particularly adapted for electrolytric cutting.

What is claimed is:

1. In a cutting machine, the combination of a work holder having a series of spaced apart work holding stations arranged in a circle, a wheel having a cutting edge and being mounted to rotate about an axis within the circle for transversely cutting the work, means for rotating said wheel about said axis, and means for orbiting said axis in a circle eccentric to the center of the circle in which said work holding stations are arranged.

2. A cutting machine according to claim 1, including means for adjusting the eccentricity of the circle in which said wheel orbits.

3. A cutting machine according to claim 1, wherein said wheel is electrically conductive, means are provided at said work holding stations for spraying an electrolyte onto said wheel, said work holding stations are connected to a source of direct current so that work serves as an electrode of one polarity, and said wheel is connected to the source of direct current to serve as an electrode of the opposite polarity.

4. A cutting machine according to claim 3, wherein said electrolyte spraying means include nozzles arranged to spray electrolyte onto said wheel adjacent its cutting edge at both sides thereof.

5. A cutting machine according to claim 1, wherein work holding stations include first clamping means on one side of said wheel for holding the piece of the work to be cut from the work, second clamping means on the other side of said wheel for holding the work, and means for operating said first and second clamping means.

6. A cutting machine according to claim 5, including means for moving said first clamping means away from and toward said work wheel when a piece of the work is cut off, and means operable to operate said first clamping means upon operation of said moving means to release the cut off portion of the piece.

7. A cutting machine according to claim 5, including means operable to release said second clamping means when said first clamping means has been moved away from said wheel, and means operable to advance the work when said second clamping means has been released.

8. A cutting machine according to claim 7, wherein said moving means move said first clamping means toward said wheel and both said clamping means are operated after said work advancing means as been operative.

9. A cutting machine according to claim 2, wherein said wheel is electrically conductive, means are provided at said work holding stations for spraying an electrolyte onto said wheel, said work holding stations are connected to a source of direct current so that the work serves as an electrode of one polarity, and said wheel is connected to the source of direct current to serve as an electrode of the opposite polarity.

10. A cutting machine according to claim 2, wherein work holding stations include first clamping means on one side of said wheel for holding the piece of the work to be cut from the work, second clamping means on the other side of said wheel for holding the work, and means for operating said first and second clamping means.

11. A cutting machine according to claim 3, wherein work holding stations include first clamping means on one side of said wheel for holding the piece of the work to be cut from the work, second clamping means on the other side of said wheel for holding the work, and means for operating said first and second clamping means.

12. A cutting machine according to claim 4, wherein work holding stations include first clamping means on one side of said wheel for holding the piece of the work to be cut from the work, second clamping means on the other side of said wheel for holding the work, and means for operating said first and second clamping means.

References Cited

UNITED STATES PATENTS 3,061,529  10/1962  Crompton  204—143 ELM
3,450,618  6/1969  Sutton  204—143 ELM JOHN H. MACK, Primary Examiner R. J. FAY, Assistant Examiner U.S. Cl. X.R.

51—90; 83—490; 204—143 G, 224